United States Patent [19]

Flint et al.

[11] Patent Number: 5,559,670
[45] Date of Patent: Sep. 24, 1996

[54] CONVERTIBLE DISPLAY COMPUTER

[75] Inventors: Ephraim B. Flint, Garrison; Alphonso P. Lanzetta, Marlboro; Lawrence S. Mok, Brewster, all of N.Y.

[73] Assignee: International Business Machines Corporation, Armonk, N.Y.

[21] Appl. No.: 324,567

[22] Filed: Oct. 18, 1994

[51] Int. Cl.⁶ .............................. H05K 5/03; G06F 1/16
[52] U.S. Cl. .................. 361/681; 364/708.1; 439/31; 361/679
[58] Field of Search ........................ 361/679, 680, 361/681, 682, 683; 364/708.1; 439/23, 25, 28, 31; G06F 1/16

[56] References Cited

U.S. PATENT DOCUMENTS

| | | | |
|---|---|---|---|
| 5,103,376 | 4/1992 | Blonder | 361/393 |
| 5,115,374 | 5/1992 | Hongoh | 361/393 |
| 5,205,017 | 4/1993 | Wang | 16/237 |
| 5,224,060 | 6/1993 | Ma | 364/708.1 |
| 5,233,502 | 8/1993 | Beatty et al. | 361/729 |
| 5,267,123 | 11/1993 | Boothroyd et al. | 361/680 |
| 5,268,817 | 12/1993 | Miyagawa et al. | 361/681 |
| 5,276,589 | 1/1994 | Bartlett et al. | 361/681 |
| 5,390,075 | 2/1995 | English et al. | 361/683 |

FOREIGN PATENT DOCUMENTS

| | | | |
|---|---|---|---|
| 0454120 | 10/1991 | European Pat. Off. | G06F 1/16 |
| 406019577 | 1/1994 | Japan | G06F 1/16 |

*Primary Examiner*—Leo P. Picard
*Assistant Examiner*—Lynn D. Feild
*Attorney, Agent, or Firm*—Daniel P. Morris; Alvin J. Riddles

[57] ABSTRACT

The invention is a convertible display computer structure in which the display is centrally pivoted in a frame that in turn is hinged on one side on the keyboard so that the display can be positioned to face toward the user when the frame is positioned to be essentially vertical with respect to the keyboard and when it is desired to provide graphic information entry, the display can be turned over so as to serve as a writing surface when the hinged frame is positioned over the keyboard. The conversion from keyboard to graphic stylus input is accomplished by rotating the display on the pivot mountings and then closing the frame over the keyboard with the display surface up and in the proper orientation.

6 Claims, 2 Drawing Sheets

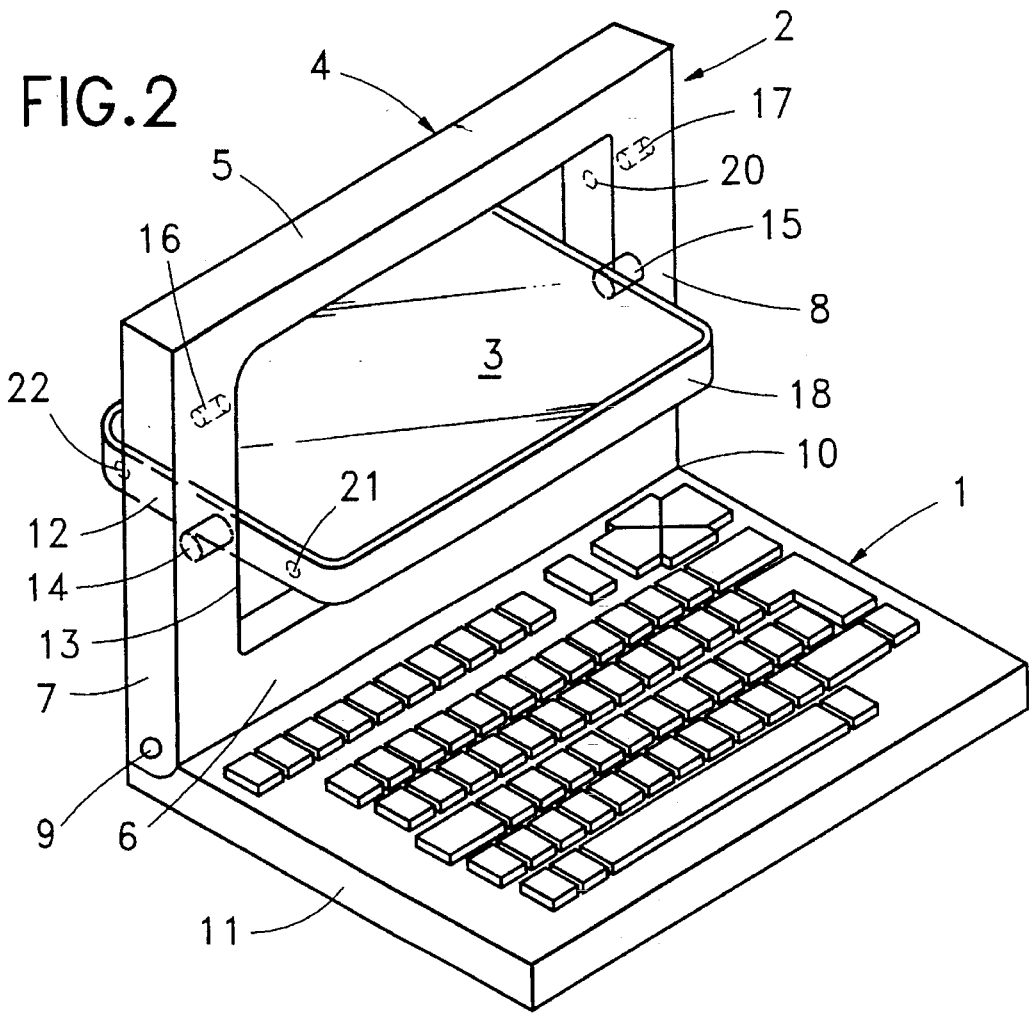
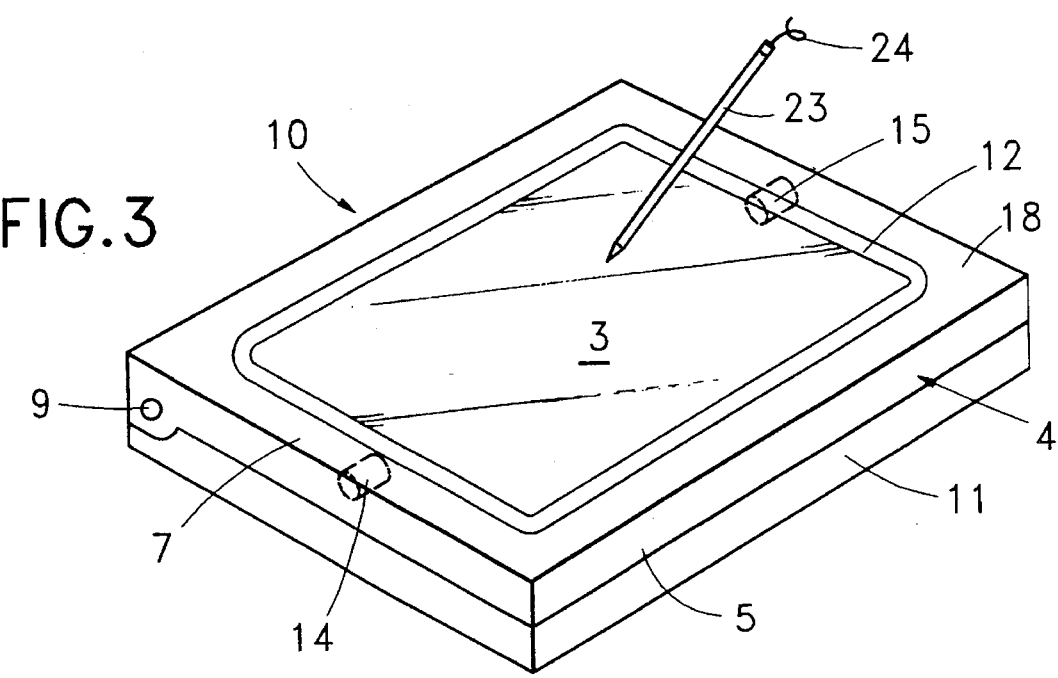

CONVERTIBLE DISPLAY COMPUTER

FIELD OF THE INVENTION

The invention relates to computers and in particular to a computer with a display element operable in convertible positions.

BACKGROUND OF THE INVENTION AND RELATION TO THE PRIOR ART

In the development of computers, particularly of the types known in the art as laptop or notebook, efforts have been directed to providing as many features as possible in a small and light weight package. The most efficient and physically rugged universal package that has evolved in the art is one in which the display screen portion is hinged on the portion of the keyboard away from the user; so that it can be positioned essentially vertical with respect to the keyboard when in use and can be folded down over the keyboard when not in use.

A feature of being able to manually enter graphical information into the computer is becoming a desirable addition. A hand written or pictorial entry is considered graphical information. The entry can be accomplished with the universal package through using a graphic stylus together with the addition of a touch screen surface on the display element or through the use of a stylus that provides a signal that interacts with the display. The technology of the touch screen and the graphic stylus are well developed in the art.

When, however, the manually entered graphical information is to be introduced on a computer arranged using the general universal type of package, provision must be made to have a place for the writing on the display, and for maintaining the orientation of that writing the same as the orientation of the display when displaying keyboard entered information.

One approach to the problem is provided in the art in U.S. Pat. No. 5,103,376 wherein a special supporting hinge mechanism permits positioning either the keyboard part or the display part on a supporting surface while the other part is held in essentially vertical relationship to the part that is on the supporting surface.

Another approach to the problem is provided in the structure shown in U.S. Pat. No. 5,233,502. In this structure the display is a modular and reversible insert type element that can be placed in a frame that is hinged on the keyboard so that the display surface can, by taking the display out and reversing it, serve as the top surface of the cover, when the frame is folded down over the keyboard.

A further approach to the combined support and orientation reversal problems is the use Of a special pivotal hinge that permits the display to be turned over and then repositioned over the keyboard. This structure is shown in U.S. Pat. No. 5,205,017.

In all the approaches to the Problems heretofore in the art significant changes in structure and interruptions in use resulting from repositioning the parts of the computer are involved in being able to manually introduce graphical information through the display part.

SUMMARY OF THE INVENTION

The invention is a convertible display computer structure in which the display is centrally pivoted in a frame that in turn is hinged on one side on the keyboard so that the display can be positioned to face toward the user when the frame is positioned to be essentially vertical with respect to the keyboard and when it is desired to provide graphic information entry the display can be turned over so as to serve as a writing surface when the hinged frame is Positioned over the keyboard. The conversion from keyboard to graphic stylus input is accomplished by rotating the display on the pivot mountings and then closing the frame over the keyboard with the display surface up and in the proper orientation.

BRIEF DESCRIPTION OF THE DRAWINGS

FIG. 2 is a perspective view of the computer structure of the invention with the display part in the process of being converted.

FIG. 3 is a perspective view of the computer structure of the invention with the display part converted and in position for graphic input.

DESCRIPTION OF THE INVENTION

Figure 1:
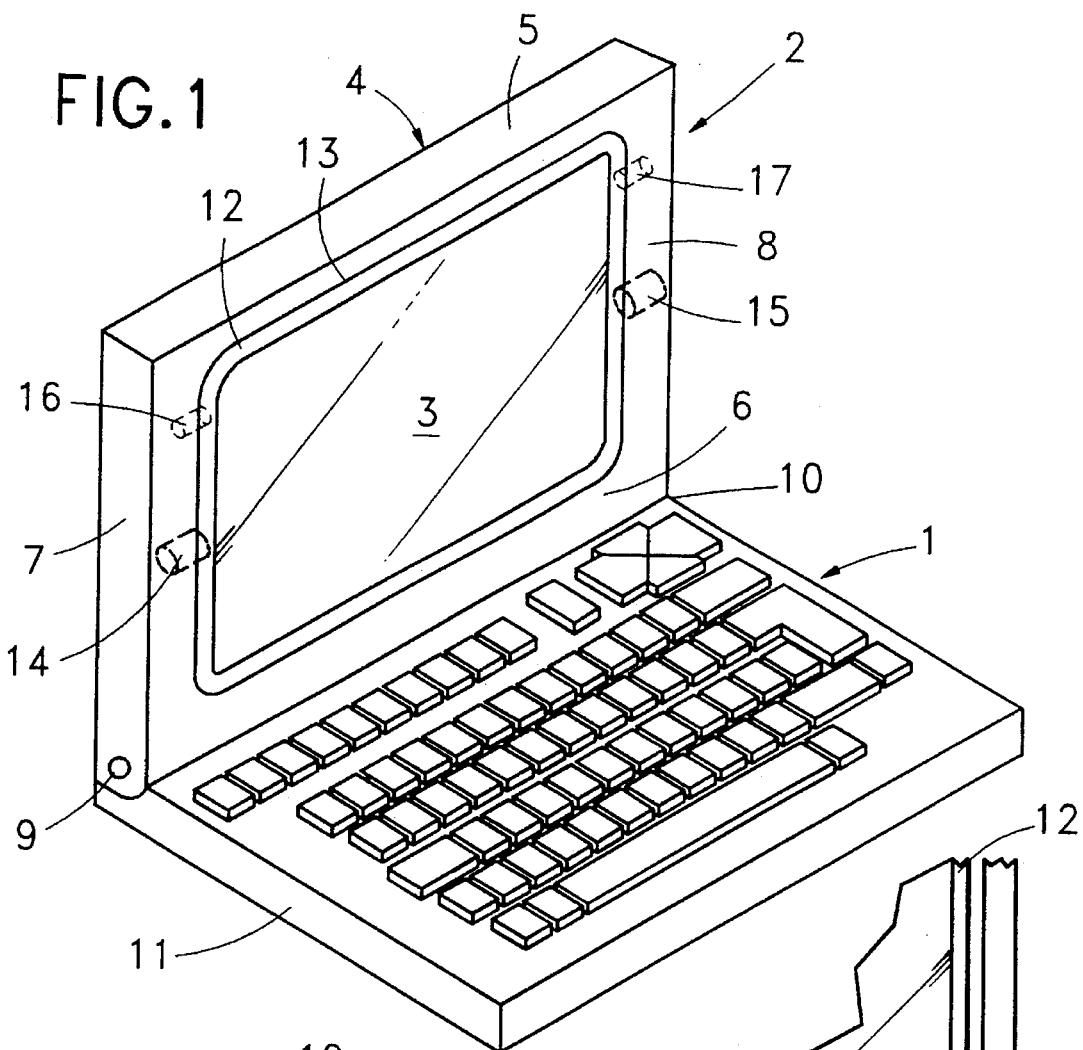
FIG. 1 is a perspective view of the computer structure of the invention with the display part facing the user.

Referring to FIG. 1 there is shown a perspective view of the convertible display computer of the invention. In FIG. 1 there is a standard keyboard part I and a display part 2 that is made up of a display element 3 mounted in a frame 4 having a top portion 5, a bottom portion 6 adjacent the keyboard 1 and left 7 and right 8 sides. The frame 4 is hinged to the keyboard 1, by elements 9 and 10, only element 9 being visible in this view. The electrical wiring for the display element 3 pass in the frame 4 to the computer in the support portion 11 for the keyboard 1. The display element 3 may be of the standard, plasma, liquid crystal or other flat display type. A touch screen surface is provided where touch input is to be involved. In operation the information is displayed on the display element 3 reading from left to right.

In accordance with the invention the display element 3 is convertible from the display position to a supported, properly oriented graphical input position. The convertibility is achieved by mounting the display element 3 in an element 12 that surrounds the display element 3, has a clearance fit with respect to the display area opening 13 which extends through the frame 4 and has pivot members 14 and 15. The pivot members 14 and 15, shown dotted, are located at the centerpoint of the sides 7 and 8, and extend into bearing openings, not shown, in the frame 4. With this construction the display element 3 is pivotally supported for turning over so that the display element 3 face can be toward or away from the user. Manually operated latch members 16 and 17 are positioned in each side of the frame 4 and when moved toward the display element 3, each move an interposer element, not visible in this figure, into engagement with an opening in the element 12, also not visible in this figure, that locks the pivotal movement of the display element 3 into the forward or reversed position.

FIG. 2 is a perspective view of the computer of the invention with the display element thereof in an intermediate position as it is being changed from the forward to the reversed position. Referring to FIG. 2, in which the same reference numerals are used for like elements. The display element 3 is surrounded by, and is retained in, the element 12 which performs the functions of supporting pivot members 14 and 15, shown dotted, at the midpoints of each side. The pivots 14 and 15 in turn extend into and are supported by bearing openings; not visible in this figure, in the sides 7 and 8 of the frame 4. In the view provided by FIG. 2 the display element 3 is partially rotated between forward and reversed. The edge 18 that was adjacent to the bottom 6 of the frame 4 in FIG. 1 having been moved in the direction of the top 5 of the frame 4. In FIG. 2, more of the the latches 16 and 17 and their functions are visible. At the completion of the rotation, the edge 18 will be adjacent to the top 5 of the frame 4 in the display opening 13. The latches 16 and 17 are each moved in the direction of the display opening 13, which in turn moves interposers 19 and 30 of which only 20 is visible in this Figure, into openings in the member 12 to lock the display element 3 into position. In the view of FIG. 2 openings 21 and 22 are visible. When the display element 3 is in the reversed position with the edge 18 adjacent the top 5 of the frame 4 the interposer of the latch 16 is in the opening 21 when in the locked position. Similarly, when the display element 3 is in the forward position as shown in FIG. 1, the edge 18 is adjacent the bottom 6 of the frame 4 and the interposer of the latch 16 is in the opening 22 when in the locked position.

When the display element 3 is locked in the reversed position facing away from the user, the top 5 of the frame 4 is drawn toward the user. The frame 4 and display element 3 assembly, moving on the hinges 9 and 10, comes down and cover the keyboard 1, thereby positioning the display element 3, in supported position for writing and with proper orientation or left to right information entry.

In FIG. 3 the computer of the invention is shown in perspective with the frame 4 and display element 3 assembly folded down over the keyboard 1. The display element 3 faces up and as a result of the travel into the folded position the edge 18 is next to the user and the same orientation for information display or input is maintained. In FIG. 3 the same reference numerals are employed for like elements from the earlier figures.

Referring to FIG. 3, the face of display element 3 is in supported and properly oriented position for left to right information entry through a graphic stylus shown symbolically as element 23. Where the display element 3 is of the type that responds to the graphic stylus type of interaction, the stylus 23 is supplied with signals through a conductor connected to the computer 11 and shown symbolically as element 24. Where the display element 3 is of the type having a pressure responsive touch screen over the face, the stylus 23 merely concentrates and focuses manual pressure and the element 24 is not required.

Electrical connections between the display element 3 and the completer 11 usually involve wiring in the frame 4 that goes from the portion of the computer 11 at the hinge 9 and 10 region to edge terminals on the display element 3.

Figure 4:
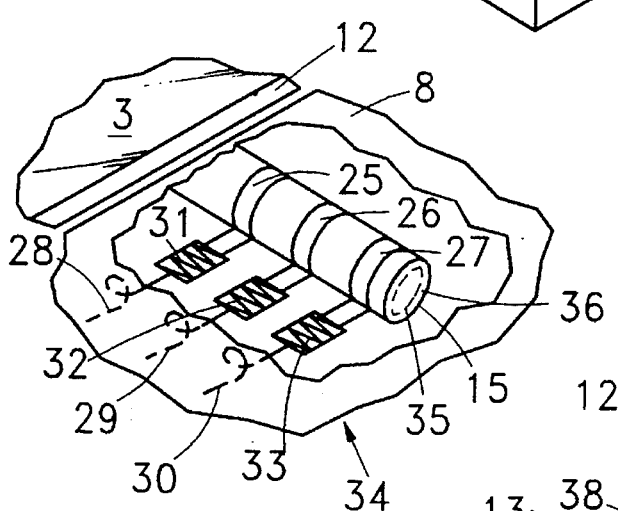
FIG. 4 is an illustration of conductive ring electrical connections to pivotal members.
Figures 5, 6:
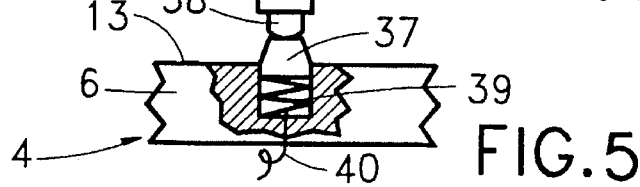
FIGS. 5 and 6 are illustrations of a contact pin form of electrical connection to the display part.

In a preferred embodiment the connections are made through the pivoting members 14 and 15 through the use of conductive ring and spring loaded brush type technology standard in the electrical equipment art. An example is illustrated in connection with FIG. 4. Referring to FIG. 4 a perspective depiction is provided of a portion of the side 8 of the frame 4 where the pivot member 15 of the element 12 passes through the bearing opening in the frame 4. Inside the frame 4 the pivot member 15 is equipped with a series of conductive rings, of which three, 25, 26 and 27 are shown, insulated from each other and each with an insulated connection not shown to an edge terminal of the display element 3 through the pivot member 15. Connection is made to the computer 11 via conductors 28, 29 and 30 which contact the conductive rings 25, 26 and 27 through spring loaded brushes 31, 32 and 33 respectively. The brushes being mounted in a brush holding block 34 as is standard in the electrical equipment art. In the structure depicted in FIG. 4 electrical continuity is maintained through 360 degree rotation of the display element 3 and as many conductors as desired may be accommodated through the use of additional conductive rings and their placement on both pivot members 14 and 15. While the conductive ring structure is illustrated around the periphery of the pivotal member 15, it will be apparent that the conductive rings may alternatively be on the inside surface of a larger diameter pivotal member with the brushes mounted on a member that extends into a bore 35 shown dotted in the end 36 of the pivotal member.

Where it is desirable to provide the connections at the edge of the display element 3 such as at the edge 18 of the element 12, a spring loaded pin connection that is registered in contact by the fact that the display element 3 is locked by the latch interposers and openings 21, 22 etc. may be employed. Such a situation is illustrated in connection with FIGS. 5 and 6. In FIG. 5 a cross sectional view is provided of the intersection of a portion of element 12 at the opening face of the display opening 13 of the frame 4. In the surface labelled 13, a contact 37, connected to a terminal of the display element 3, is urged into contact with a contact 38 in the element 12. The contact 38 is tinder spring 39 loading, so that when the element 12 is locked into position the contacts are aligned and electrical continuity to the computer 11 is through conductor 40. As many contact combinations as needed may be employed. In FIG. 6, in a perspective view the contact pair 37, 38 are shown in the corner of the display element 3, with the conductor 40 shown dotted.

What has been described is a convertible display computer structure in which the display is centrally pivoted in a frame that in turn is hinged on one side on the keyboard so that the display can be turned over and positioned above the keyboard for support and maintenance of left to right information orientation when it is desired to enter graphic information through the display.

What is claimed is:

1. In a computer of the type having a computer base that supports a keyboard with a display element and graphic input element combination that as a unit reversibly rotates on central pivot members on each side of said unit and which pivot members extend into a frame with a hinged attachment of said frame at an edge of said computer base, the improvement comprising, an electrical connection, through at least one conductive ring and brush at said pivot members, and, a spring loaded, contact at said frame edge, between at least one of said display element and said graphic input element and wiring to said computer base, in said frame.

2. The improvement of claim 1 wherein said conductive ring and brush includes at least one ring on at least one of each said pivot members with a holder supported brush in contact with each said ring.

3. The improvement of claim 1 wherein said spring loaded, edge contact includes at least one electrically connected spring loaded contact member positioned in said frame and an edge terminal positioned in an edge of said display and graphic input unit, and is electrically connected to said display and graphic input unit.

4. A computer of the notebook or laptop type wherein a superimposed display and graphic input part as a unit in a frame reversably rotates on centrally positioned side pivot members, said frame being hinged on and foldable over a computer base that supports a keyboard, the improvement comprising, providing, in said frame an electrical interconnection between said display and graphical input part and wiring to said computer base, using at least one of conductive ring and brush at said pivot members, and, a spring loaded contact at said frame edge.

5. The improvement of claim 4 wherein said conductive ring and brush includes at least one ring on at least one of each said pivot members with a holder supported brush in contact with each said ring.

6. The improvement of claim 4 wherein said spring loaded edge contact includes at least one electrically connected spring loaded contact member positioned in said frame and an edge terminal positioned in an edge of said display and graphic input part and electrically connected to said display and graphic input part.

* * * * *